United States Patent
Hart et al.

[11] 3,765,787
[45] Oct. 16, 1973

[54] MULTI-SPINDLE MACHINE TOOL HEADS

[75] Inventors: Raymond Hart, Northwood; Kenneth Charles Sandell, Leigh-on-Sea, both of England

[73] Assignee: Firth Machine Tools (International) Limited, London, England

[22] Filed: Nov. 4, 1969

[21] Appl. No.: 873,925

[30] Foreign Application Priority Data
Nov. 8, 1968   Great Britain.................. 52,938/68

[52] U.S. Cl.................. 408/53, 408/141, 408/234, 90/11 A, 287/53 SS, 308/189 R
[51] Int. Cl............................................ B23b 39/16
[58] Field of Search.................. 90/11 A, 11 R; 408/53, 32, 42, 141, 234; 308/189 R; 287/53 SS, 2; 74/665 R

[56]   References Cited
UNITED STATES PATENTS
3,429,224   2/1969   Osburn....................... 308/189 R X
3,221,605   12/1965   Hemmerle, Jr..................... 90/11 A
2,001,566   5/1935   Brunner........................... 308/189 R
2,356,506   8/1944   Clausen............................. 90/11 A
2,884,818   5/1959   Speckin et al................... 74/665 R Primary Examiner—Gil Weidenfeld
Attorney—Penrose Lucas Albright et al.

[57]   ABSTRACT

A multi-spindle drilling or reaming unit has a plurality of spindles which are individually removable and replaceable. Hitherto, damage to one spindle necessitated complete replacement of the whole unit. Each spindle has angular contact thrust-accommodating bearings (or other bearings capable of sharing thrust loads) and means, for example a sleeve are provided for locking the inner or outer race of each bearing when the associated spindle is secured in its bore by a retaining flange and bolts.

6 Claims, 7 Drawing Figures

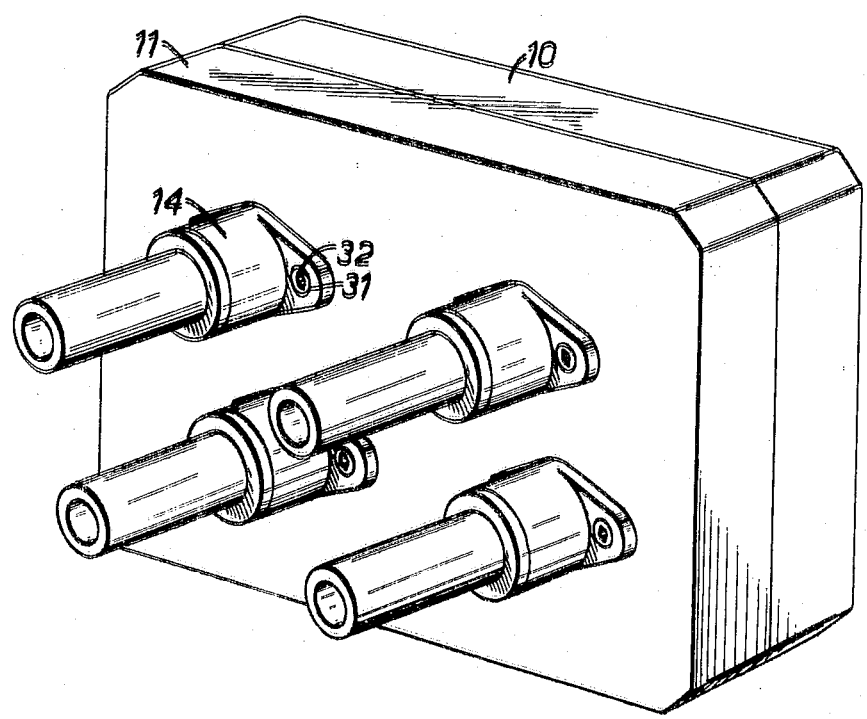
FIG. IA.

PATENTED OCT 16 1973

3,765,787

INVENTORS
RAYMOND HART
KENNETH C. SANDELL
BY Ennis, Edmonds
Marton, Taylor and Adams
ATTORNEY

MULTI-SPINDLE MACHINE TOOL HEADS

BACKGROUND OF THE INVENTION

1. Field of the Invention

This invention relates to multiple-spindle drilling and reaming units.

2. Summary of the Prior Art

The use of multiple-spindle units or heads for drilling, reaming, milling and other machining operations is common practice particularly in the motor vehicle engine industry and it is possible to drive forty or more spindles through a transmission having some parts, at least, which are common to each spindle. Such a transmission customarily takes the form of gear wheels mounted in a gear box which also serves both to journal the spindles and to take-up the substantial thrust loads which are encountered in use. Such multiple-spindle heads have been very widely used in the motor vehicle engine industry for many years for drilling stud holes and other bores in cylinder blocks and other vehicle engine components.

In the event of damage or failure of one spindle and/or its assembly, it has hitherto been necessary to remove the gear box as a whole together with all of the spindle assemblies from the associated machine tool in order to replace only one spindle and/or its assembly. Clearly such removal involves a substantial time loss unless a spare gear box and tool assemblies are at once available and the actual replacement of the defective part involves stripping of the gear box. Such availability of spare heads substantially increases the capital cost of the plant, since the spare gear box or boxes would represent a substantial unproductive expenditure particularly because there is no interchangeability between multi-spindle heads required for different operations. It is desirable to reduce this high capital expenditure, to reduce the time loss resulting from the replacement of a complete multi-spindle head and to simplify the actual replacement of a defective spindle. Further, for certain applications it is necessary to provide a construction for the head in which individual spindles can be closely spaced from one another. Both of these desiderata must not, however, sacrifice the capability of each spindle assembly of accommodating high thrust as well as journal loads.

SUMMARY OF THE INVENTION

According to the present invention there is provided a multiple-spindle drilling or reaming unit each spindle of which is individually removable from and replaceable on the face of the head lying adjacent to the tool-carrying ends of the spindles, at least thrust-accommodating bearings of each spindle being removable simultaneously with the spindle from the said face, said unit including means for releasably retaining each said spindle in the unit and means for preventing rotation of one component of each said bearing when located in the unit.

Further according to the present invention there is provided a multiple-spindle drilling or reaming unit comprising a plurality of spindles, a cartridge shell for each spindle, a stack of angular contact bearings disposed between the interior of each cartridge shell and the respective spindle, and means for detachably securing the cartridge shell to the casing of the unit, said bearings serving to accommodate thrust loads on the spindle and each said cartridge shell and spindle being readily removable from the face of the unit adjacent the tool-carrying ends of the spindles in order to replace the shell and spindle assembly by another such assembly.

Still further according to the present invention there is provided a multiple-spindle drilling or reaming unit comprising a plurality of spindles, and a stack of thrust-resisting bearings to support each said spindle in the unit, said bearings each having an inner race fast with the spindle and an outer race which is a close sliding fit in a bore in the unit but which is restrained from rotation when engaged in said bore, each said spindle and the bearings thereof being readily removable from and replaceable in the unit at the face of the unit lying adjacent the tool-carrying ends of the spindles.

BRIEF DESCRIPTION OF THE DRAWINGS

Certain embodiments of multiple-spindle drilling units will now be described, by way of example, with reference to the accompanying diagrammatic drawings, in which:

FIG. 1A is a perspective view of a multi-spindle drilling unit;

DESCRIPTION OF THE PREFERRED EMBODIMENT

Figure 1:
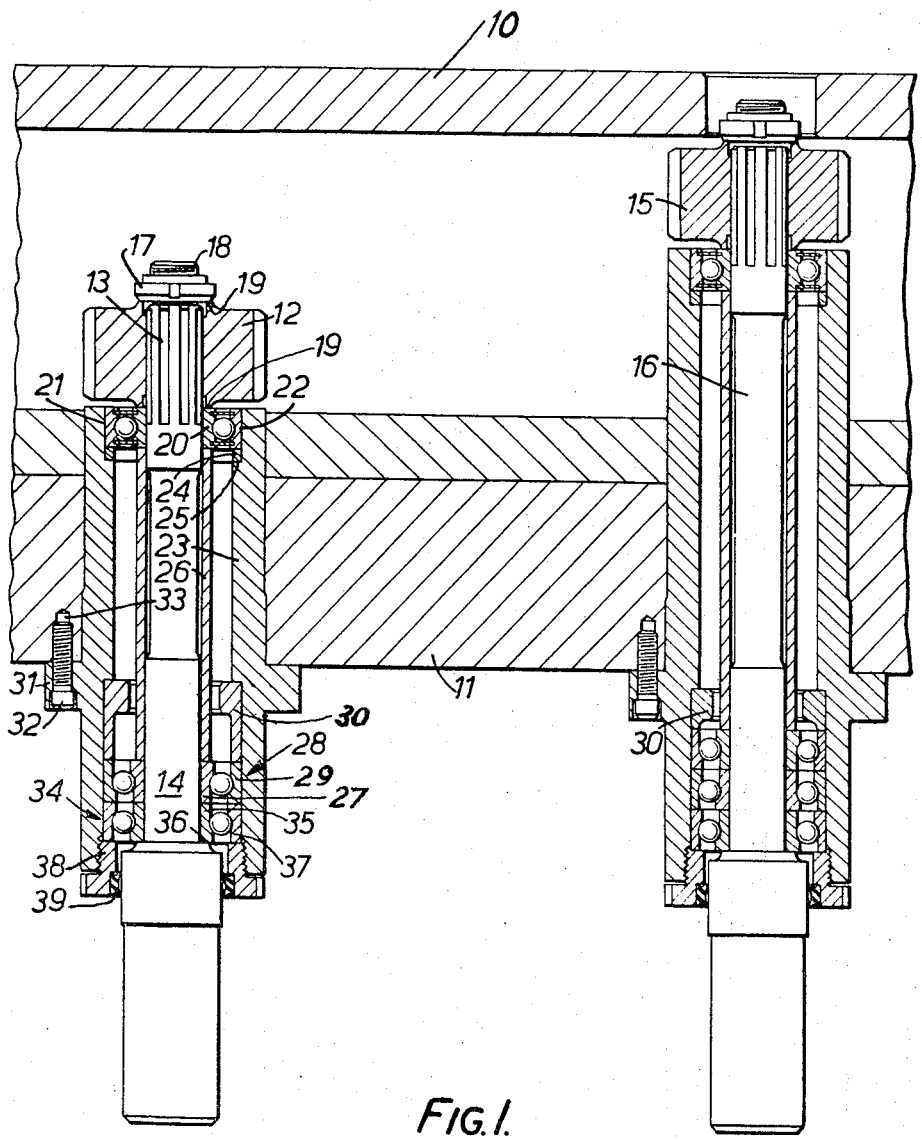
FIG. 1 is a longitudinal fragmentary section of a first embodiment.

Referring now to the drawings and in particular to FIG. 1 and FIG. 1A, a multi-spindle drilling unit or head comprises a rear casing half 10, secured by means, not shown, to a front casing half 11, both casing halves being recessed internally to accommodate a gear train transmission which is generally conventional and will not be described in detail. In the drawing, a gear wheel 12 fast by means of splines 13 with one spindle 14 forms a part of a "B" level gear train and a gear wheel 15 fast with a spindle 16 forms part of a "C" level gear train. There is, of course, an "A" level gear train driving other spindles, but this is not shown. The three gear trains "A," "B" and "C" serve to drive spindles at difficult speeds depending on the required cutting rate for each individual cutting tool. Each train will drive several spindles.

As will be apparent each spindle assembly is substantially the same and therefore only one spindle 14, will be described in detail. The gear wheel 12 is restrained from axial movement relative to the spindle by a nut 17 which is screwed on to a screw-threaded extension 18 of the spindle and is locked thereon. Adjacent the gear wheel 12 which has a pair of axial abutment faces 19, the inner race 20 of a ball bearing 21 abuts against one of the abutments 19 while the outer race 22 is fast in one end of an elongate cartridge shell 23. As is conventional, the outer race 22 abuts an annular spacer 24 which in turn abuts a shoulder 25 formed internally of the shell 23. The inner race 20 abuts one end of a sleeve 26 which is coaxial with the spindle 14 and extends to abut, at its other end, the inner face 27 of an angular contact ball bearing 28 (known per se).

The cartridge shell 23 extends along the spindle length and carries the outer race 29 of the bearing 28, the outer race being located by an annular section distance piece 30 which abuts against an internal shoulder of the shell 23. The distance piece 30 is given a substantial clearance from the sleeve 26. Externally, the shell 23 has a part annular flange 31 by which the shell is secured through the intermediary of a bolt 32 and a tapped bore 33 in the gear-box front casing 11. A further angular contact bearing 34 is similarly mounted to the bearing 28, but the inner race 35 thereof abuts an annular shoulder 36 of the spindle instead of the sleeve 26. The outer race 37 is held in position by a short, flanged externally-screwed sleeve 38 which carries an annular seal 39. The cartridge shell 23 is a tight fit in the casing half 11, but not so tight as to prevent ready withdrawal when required by simple removal of the bolt 32.

Depending upon the calculated load on any given spindle, two or more angular contact bearings are mounted with the cartridge shell 23 end-to-end and the outer race of the outermost (i.e. most remote from the gear wheel) of these bearings is retained in position by the externally-screwed sleeve 38.

One of the angular contact bearings 28, 34 serves for location whereas the other bearing or bearings is/are arranged as a stack and share the thrust loads. In theory, the thrust loads are exactly shared, but despite very close tolerances the sharing is not exact, but is adequate for parctical purposes. The configuration of an angular contact bearing is inherently conducive to load sharing.

To ensure proper seating both of the spacer 30 and of the angular contact bearings 28, 34 the corner of the shoulder of the bore in the hollow stationary shaft is radiused.

Because of the thrust load-sharing capabilities of the angular contact bearings, the thrust resulting from boring operations is adequately accommodated. The removal in event of fracture or other failure is effected simply by unscrewing the bolt 32 and withdrawing the cartridge axially, and a fresh cartridge assembly is inserted into the bore of the casing half 11. When the gear wheel is correctly meshed with the corresponding gear wheel (not shown) of the transmission, the bolt 32 is re-inserted, tightened and the head is ready for continued operation. It will be appreciated that the head can remain mounted on the associated machine tool throughout the change-over operation.

Figure 2:
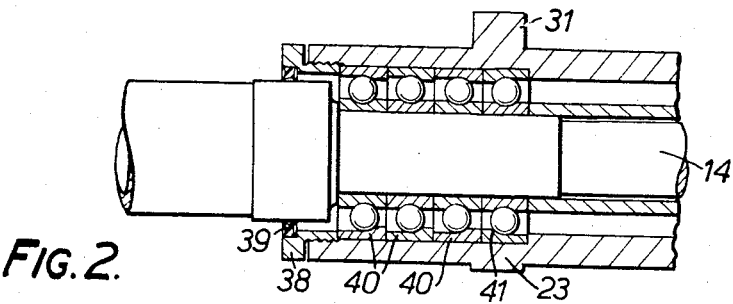
FIG. 2 is a fragmentary longitudinal section showing a part of the first embodiment but with one alternative type of bearing.

In the modification illustrated in FIG. 2, three angular contact bearings 40 are provided for sharing the thrust load and one angular contact bearing 41 is provided for location purposes.

In contrast to FIG. 1 no distance piece is provided, but otherwise the bearing arrangement is similar and like parts have been given the same reference numerals.

Figure 3:
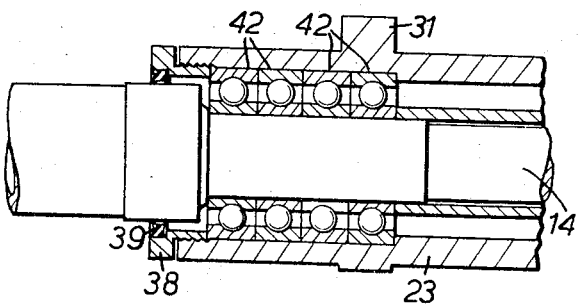
FIG. 3 is a fragmentary section similar to FIG. 2 but with a second alternative form of bearing.

In FIG. 3, the angular contact bearings are replaced by deep groove ball bearings 42 which are manufactured to very close tolerances. Otherwise the installation is similar to that of FIG. 2.

Figure 4:
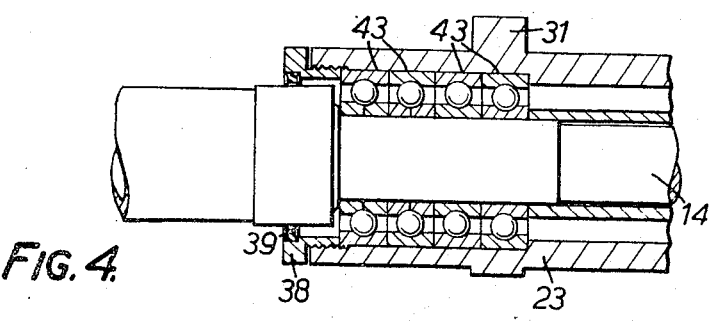
FIG. 4 is a fragmentary longitudinal section similar to FIG. 2 but with a third alternative form of bearing.

In FIG. 4, the angular contact bearings are replaced by duplex bearings 43, in which either the inner or outer race is split. Again the installation is similar to FIG. 2. The bearings both of FIG. 3 and FIG. 4 must be specially prepared to ensure an adequate degree of load sharing, which contrasts with angular contact bearings in which load-sharing is to some extent inherent in the design.

Figure 5:
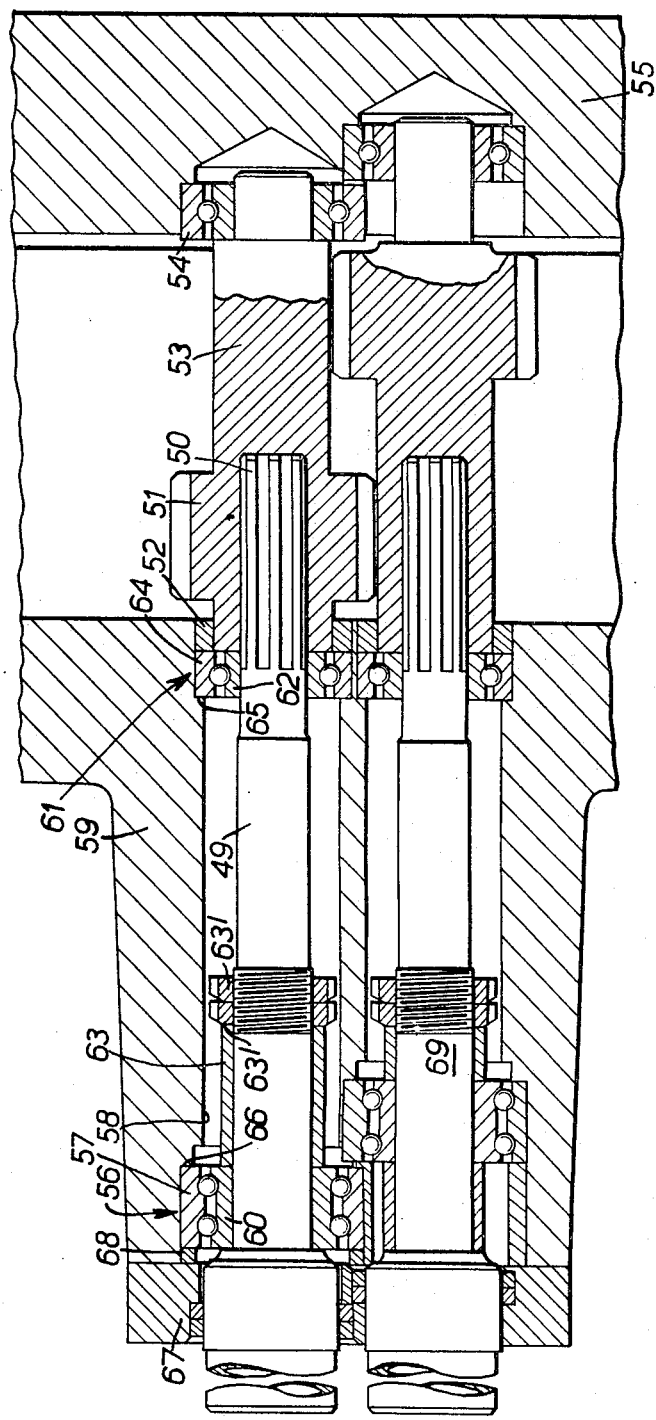
FIG. 5 is a fragmentary longitudinal section of a second embodiment.

Referring now to the embodiment of FIG. 5, the main difference with respect to the embodiment of FIG. 1 is the omission of any removable cartridge shell, the shell being formed by the casing, and changes following from this omission. In this embodiment, the spindle 49 is splined over an end portion 50 and this engages complementary internal splines of a gear wheel 51 which meshes with a gear wheel of one of the gear trains of the main drive (not shown in this Figure). A bush 52 surrounds the spindle adjacent the gear wheel to prevent the gear wheel 51 from becoming substantially misaligned when the spindle is disengaged from the gear wheel splines. The gear wheel 51 is integral with or rigidly secured to a stub shaft 53 which is journalled by a ball bearing 54 mounted in the rear casing half 55. The spindle 49 is journalled by a single, double-row angular-contact bearing 56 to outer race 57 of which is a sliding fit in a bore 58 of the front casing half 59. The inner race 60 is an interference fit on the spindle 49 and abuts one end of sleeve 63. The sleeve is held in position by lock nuts 63' one of which acts on the other end of the sleeve. In addition to the angular contact bearing 56, the spindle is journalled adjacent the gear wheel 51 by a ball bearing 61. The outer race 64 of the roller bearing 61 is also a sliding fit in the bore 58 but, when correctly installed is tightly pressed against a shoulder 65 in the bore thereby preventing undesired rotation of the outer race. The spindle assembly 49 is held in the bore 58 by a cover plate 67 and either an integral or separate annular member 68 (distance piece) whichlies between the inner face of the cover plate 67 and the outer end face of outer race 57 of the bearings 56. The cover plate 67 is secured to the casing by bolts 67A (only one shown). The member 68 is of such a size that the race 57 is pressed against a step 66 and is thereby restrained.

Removal of the spindle 49 is effected by unbolting the cover plate and withdrawing the spindle axially together with the bearing 56. Replacement by substitution or repair of the original spindle assembly is effected by insertion, meshing of the gear wheel with the gear wheel (not shown) of the main transmission and replacement of the cover plate.

With the embodiment illustrated in FIG. 5 it is possible to arrange two spindle assemblies in very close proximity, the bearings and gear wheel of one assembly being axially staggered with respect to the bearings and gear wheel of an adjacent assembly 69 which is otherwise identical to the one just described. A common cover plate can be used for several closely adjacent spindle assemblies. Appropriate spindle seals can be mounted in the cover plate.

Figure 6:
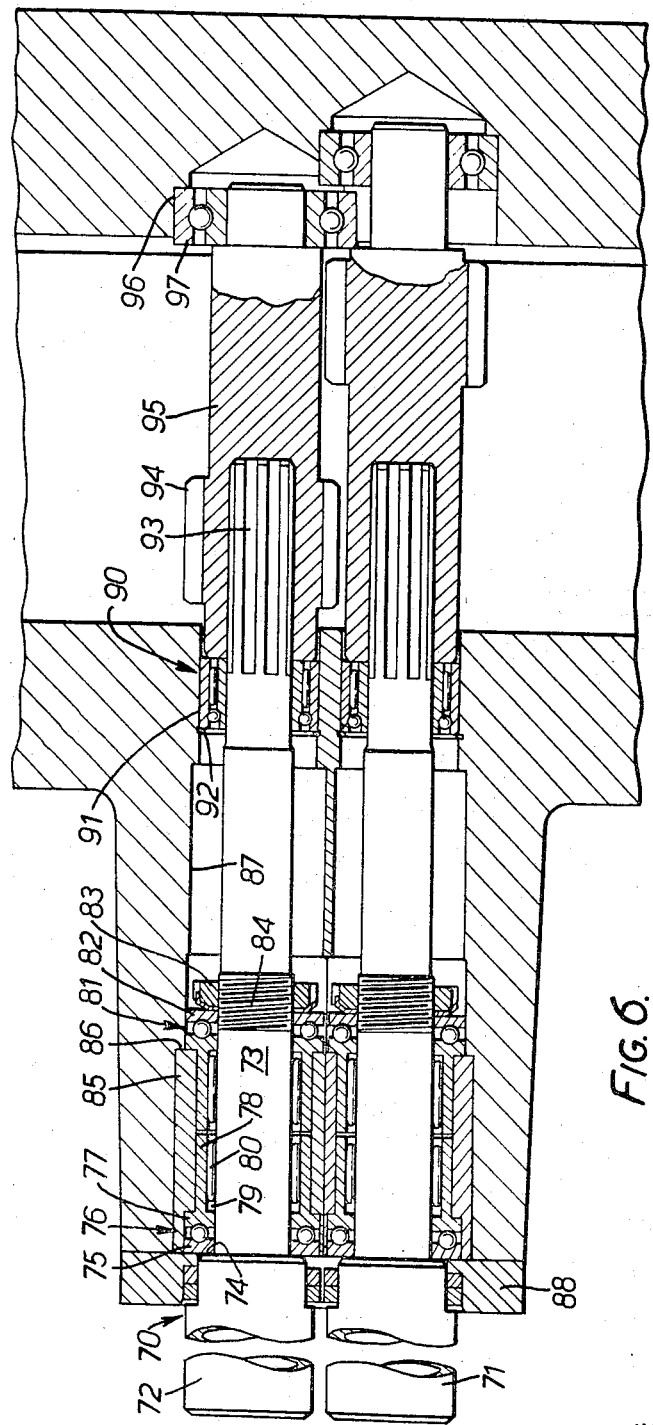
FIG. 6 is a fragmentary longitudinal section of a third embodiment.

The embodiment illustrated in FIG. 6 again shows two spindles 70, 71 and as will be appreciated the distance between the center lines is even smaller than the corresponding distance of FIG. 5. For certain applications this very close spacing is particularly advantageous. Since the spindles and their related assemblies are substantially identical, a full description will be given of one assembly only. The spindle 70 has an outer or tool-carrying end portion 72 of larger diameter than the main portion 73 of the spindle to accommodate a collect, chuck or other tool mounting means (not shown). The shoulder 74 lying between the end portion 72 and the main portion 73 acts as an annular abutment for a rotary race 75 of a thrust bearing 76. The stationary race 77 of the bearing 76 is rigid with a sleeve 78 co-axial with the shaft but spaced therefrom, and the inner periphery of the race 77 is spaced from the spindle by a small clearance. The cylindrical internal surface 79 of the sleeve 78 provides a track for needle rollers 80 and the periphery of the spindle 70 provides the inner track of the bearing. A similar, but oppositely orientated, thrust bearing 81 and a further needle roller bearing are provided to accommodate thrust laods in the opposite direction to those accommodated by the bearing 76. The rotary race 82 of the bearing 81 is located by a locked nut 83 screwed on to a screw-threaded portion 84 of the spindle. Both sleeves 78 of the bearings are secured in position by a stepped sleeve 85, an inner end face of which abuts an annular shoulder 86 formed in the spindle bore 87. The other end of the stepped sleeve 85 abuts the inner face of a cover plate 88 which co-operates with and has apertures for both spindles. By making the stepped sleeve 85 an appropriate length, tightening down of the cover plate by bolts (not shown) ensures that the sleeve 85 is locked in position. Although the stepped sleeve 85 has a plain bore concentric with the spindle, the outer cylindrical surface may either be eccentric, as indicated, or a part of the sleeve may be provided with a flat to enable close juxtaposition with an adjacent sleeve.

At the end of the spindle 70 remote from the tool-carrying end portion, a further bearing assembly 90, is provided. The assembly takes the form of a combined angular contact bearing and a needle roller bearing, an outer race 91 being retained by a circlip 92 engaged in a groove in the bore 87 and the inner face being fitted on the spindle.

Inwardly of the bearing assembly 90, the spindle is splined at 93 and engages in complementary splines within a gear wheel 94. The latter is integral with a short shaft 95 which is journalled in a rear casing half 96 by a roller or ball bearong 97.

It will be seen that drive for the gear wheel of the spindle 71 is at a different level from that of spindle 70.

As in the earlier described embodiments, removal of each spindle is effected simply by removal of the cover plate, unscrewing the retaining bolts and axial withdrawal of the spindle and bearings. Refitting involves a simple reversal of these steps. The close spacing of the two spindles enables a wider range of multi-spindle heads to be produced since closely spaced bores can be drilled.

Although not illustrated, it will be appreciated that a free-end portion of each spindle is provided with a tool collet or similar tool carrying device. Since such devices are conventional, no illustration has been given.

We claim:

1. A multi-spindle drilling and reaming unit comprising
 a casing including
  means defining a front face having a plurality of spaced bores therein, and
  means defining a rear face,
 a plurality of spindles, each of said bores corresponding to and accommodating one of said spindles,
 means enabling each spindle of said plurality of spindles to be removed from and replaced in the casing from the front face thereof, each said enabling means comprising
  thrust-accommodating bearings removable together with the spindle from said front face,
  toothed gearing for driving said spindle,
  means for releasably retaining said spindle in one of the corresponding bores of the unit, and
  means for preventing rotation of one component of said thrust-accommodating bearings relative to the casing when located therein and locked by said means for releasably retaining said spindle in the casing.

2. A multi-spindle drilling and reaming unit comprising
 a casing including
  means defining a front face having a plurality of spaced bores therein,
  means defining a rear face,
 a plurality of spindles, each of said bores corresponding to and accommodating one of said spindles,
 means enabling each spindle of said plurality of spindles to be removed from and replaced in the casing from the front face thereof, each said enabling means comprising
  thrust-accommodating bearings removable together with the spindle from said front face,
  toothed gearing and driving said spindle,
  means for releasably retaining said spindle in one of the corresponding bores of the unit,
 a cartridge shell housing said spindle and said thrust-accommodating bearings, said shell having an internal screw thread, said retaining means acting to retain said cartridge shell to said casing, and
 an externally-threaded sleeve received in said internal screw thread of the cartridge shell and engaging one component of the thrust-accommodating bearings to prevent rotation thereof relative to said shell, said thrust-accommodating bearings having the form of a stack of angular contact bearings.

3. A unit in accordance with claim 2 wherein said cartridge shell has a bore with a shoulder at one end abutting an opposed portion of said one component of said thrust-accommodating bearings, and
 an external flange along its length by which it is secured to the front face of said casing.

4. A unit in accordance with claim 3 wherein the shoulder lies at a position along the length of the shell corresponding to the position of the flange.

5. In a multi-spindle drilling and reaming unit,
 a casing including
  means defining a front face having a plurality of stepped bores at predetermined spacings from one another,
  means defining a rear face,
 a plurality of spindles corresponding to the plurality of bores, each of said bores corresponding to and accommodating one of said spindles,
 means enabling each spindle of said plurality of spindles to be removed from and inserted into one of the corresponding bores of the casing from the front thereof, each said enabling means comprising
  a gear wheel,
  a shaft secured for rotation with the gear wheel,
  a first journal bearing supporting said shaft in the means defining the rear face, spine means coupling the shaft for positive rotation with said spindle while permitting relative axial motion, a second journal bearing supporting the spindle adjacent said gear wheel, a thrust-resisting bearing disposed to carry the spindle adjacent to the front of said means defining the front face of the casing, said bearing including
  an inner race,
  an outer face, and
  two rows of bearing elements disposed between the races, means locking the inner said race on said sindle, a cover plate, means for securing the cover plate to said means defining the front face of the casing, and a distance piece surrounding the spindle and interposed between the cover plate and said outer race, whereby the action of tightening the cover plate onto the means defining the front face of the casing serves to lock the outer race against the step of the corresponding bore and to prevent rotation of the outer race relative to the casing, release of said cover plate serving to free the outer race of the thrust-resisting bearing and subsequent axial withdrawal of the spindle being permitted by sliding of the outer race in the bore and relative axial sliding motion of said spline means.

6. A unit according to claim 5 wherein said chrust-resisting bearings are axially staggered in adjacent bores.

* * * * *